United States Patent [19]
Riordan et al.

[11] 4,141,605
[45] Feb. 27, 1979

[54] BEARING

[75] Inventors: Mathew B. Riordan; Arley G. Lee, both of Houston, Tex.

[73] Assignee: Eastman Whipstock, Inc., Houston, Tex.

[21] Appl. No.: 702,192

[22] Filed: Jul. 2, 1976

[51] Int. Cl.² .................. F16C 23/00; F16C 25/00; F16C 27/06
[52] U.S. Cl. .................................. 308/26; 308/73; 308/239; 308/184 R
[58] Field of Search .............. 308/189 A, 73, 239, 308/174, 26, 4 R

[56] References Cited
U.S. PATENT DOCUMENTS

| 3,215,477 | 11/1965 | Arthur | 308/26 |
| 3,350,143 | 10/1967 | Lichowsky | 308/3 |
| 3,777,195 | 12/1973 | Potter | 308/189 A |
| 3,838,899 | 10/1974 | Sampatacos | 308/189 A |
| 3,930,691 | 1/1966 | Greene | 308/72 |
| 3,971,606 | 7/1976 | Nakano et al. | 308/240 |

Primary Examiner—Richard A. Bertsch
Attorney, Agent, or Firm—Jennings B. Thompson

[57] ABSTRACT

A bearing is disclosed that includes a support housing or casing in which is located a body of elastomeric material. A plurality of wear members are positioned to be supported by the body of elastomeric material and to receive the load placed on the bearing. The elastomeric body allows the wear inserts to adjust individually to the load placed on the wear members, which greatly increases the life of the bearing. The wear members are made of a self-lubricating type material, such as one of the fluorocarbons or polyphenylene sulfide resin.

9 Claims, 5 Drawing Figures

BEARING

This invention relates to bearings of both the thrust and radial type.

The bearing of this invention has utility in various applications, and particularly in applications where the bearing is lubricated and cooled by water or water-base liquids and where the cooling fluid may contain abrasives. Such conditions, for example, are found in turbodrills used in drilling operations.

The life of the thrust bearings in a turbodrill have in the past been one of the major factors limiting the length of time the turbodrill can operate in a well bore. The thrust bearings of the turbodrill take the downward thrust imposed on the rotor when the turbodrill is initially started in operation. Then, as weight is applied to the bit which is connected directly to the rotor through the output shaft, the load imposed on the thrust bearings is reversed. It is possible that the downward thrust produced by the drilling fluid operating through the turbodrill exactly equals the reaction to the load on the bit, which would result in no load on the thrust bearings. As a practical matter, however, the load on the bit usually greatly exceeds the downward thrust of the drilling fluid on the rotor, therefore the thrust bearings are under load during the operation of the turbodrill and, as stated above, in the past have worn rapidly and have contributed substantially to the factors that limit the operational life of a turbodrill.

Turbodrill bearings are cooled and lubricated by the drilling fluid that powers the turbodrill. This fluid in most cases has water as its principal ingredient. Therefore, rubber has been used mostly for the load bearing surfaces of the bearings since water is a good lubricant for rubber. Also, rubber can better take the axial shocks imposed on the bearings during drilling operations, particularly when a rotating cutter-type bit is used. As stated above, however, such bearings wear rapidly and, in many cases, are what determine the length of time a turbodrill can operate.

It is an object of this invention to provide an improved bearing.

It is another object of this invention to provide an improved bearing having wear members made of a material having good bearing qualities mounted in a body of elastomeric material that will absorb the shock on the bearing and allow the wear members to adjust individually to the load imposed on them.

It is a further object of this invention to provide an improved thrust bearing for use in downhole drilling motors such as turbodrills, the bearing being provided with a plurality of wear members supported by a body of elastomeric material with the wear members made of a self-lubricating material having a substantially higher compressive strength than the elastomeric support body to greatly reduce the rate of wear of the bearing.

These and other objects, advantages, and features of this invention will be apparent to those skilled in the art from a consideration of this specification, including the attached drawings and appended claims.

Figure 1:
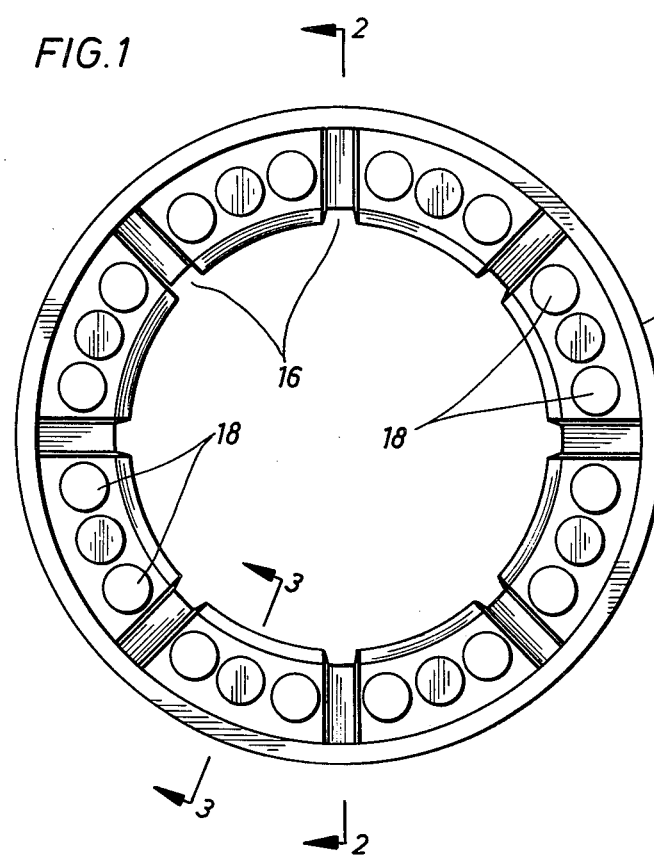
FIG. 1 is a plan view of a thrust bearing constructed in accordance with this invention.

The bearing of this invention includes a housing or casing through which the bearing load is transferred to the bearing support. It should be made of a material having sufficient strength for this purpose, such as steel. In the thrust bearing shown in FIGS. 1 through 3, housing or casing 10 includes annular or cylindrical portion or member 11 and inwardly extending annular support member or flange 12. Molded within cylindrical portion 11 and enclosing support flange 12 is body 14 of elastomeric material. The elastomer should be chosen for the particular service in which the bearing is to be used. For example, if the bearing is to be used in a turbodrill that may be operating with oil emulsion muds, the elastomer should be a synthetic rubber having oil resistant properties. Where the turbodrill is expected to be operated under high temperature conditions, the elastomer chosen should be one that will perform at such temperatures. For example, the temperature conditions may require the use of one of the silicone base materials.

Figure 2:
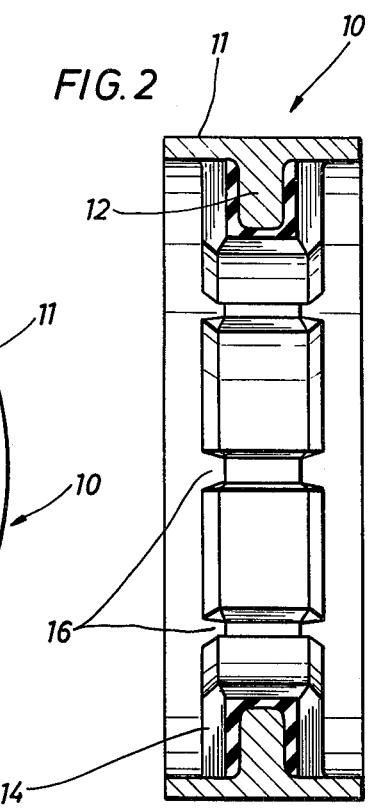
FIG. 2 is a sectional view, taken along line 2—2 of FIG. 1.
Figure 3:
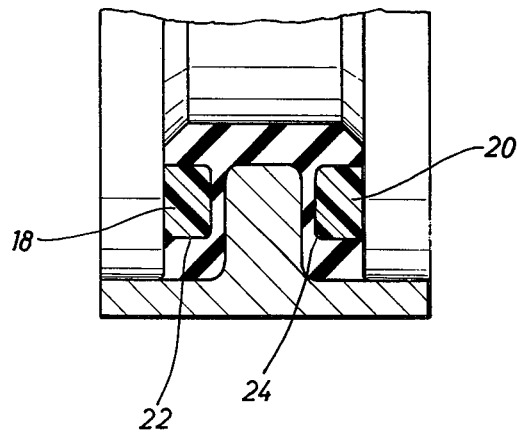
FIG. 3 is a partial sectional view on an enlarged scale, taken along line 3—3 of FIG. 1.

The bearing in FIGS. 1-3 is designed for use in a turbodrill where the bearing will be cooled and lubricated by the drilling mud pumped through the turbodrill. Therefore, body 14 is provided with a plurality of grooves 16 which provide flow passages for the drilling mud.

In accordance with this invention, a plurality of wear members are supported by the body of elastomeric material to allow each wear member to transmit the bearing load on the wear members to the housing and to allow each wear member to adjust individually to the bearing load on each member. In the embodiment shown in FIGS. 1-3, wear members 18 and 20 are positioned on opposite sides of inwardly extending support member 12. The wear members are cylindrical and are located on opposite sides of the support flange which, in effect, provides two bearing surfaces, because, as explained above, when used in a turbodrill, the bearing is subjected to loading from opposite directions depending upon the downhole conditions.

The wear members may be positioned in cavities 22 provided in the body of elastomeric material when it is molded. The members are held in the cavities in any convenient manner, such as with an adhesive or an interference fit by providing cavities 22 with a diameter less than that of the wear members to cause the body to grip the members sufficiently to hold them in place.

Figure 5:
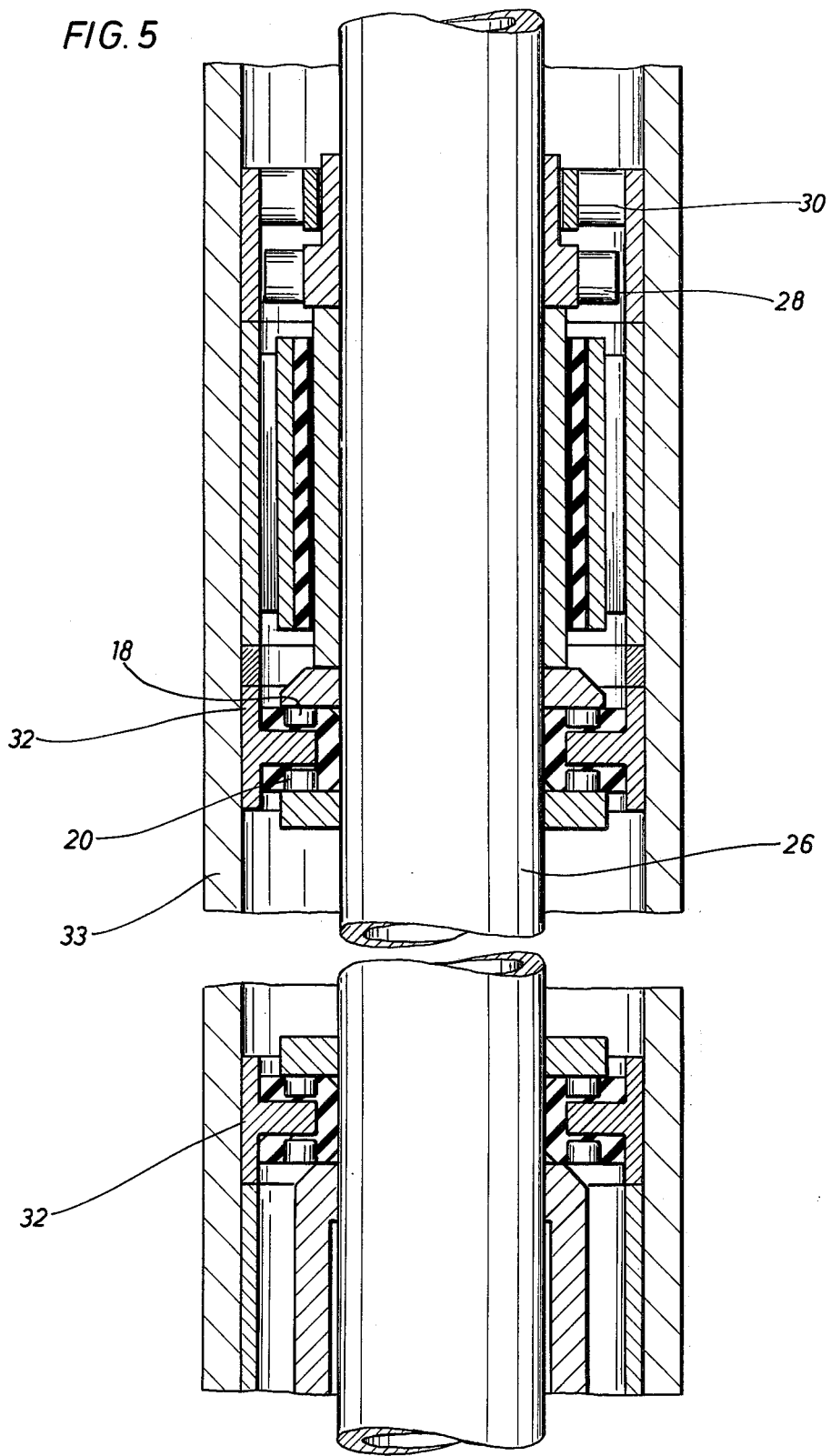
FIG. 5 is a cross-sectional view of the thrust bearing section of a turbodrill equipped with the thrust bearings of FIGS. 1-3.

The wear members are positioned so that one side provides a bearing surface to receive the load imposed on the bearing by the member that it supports for rotation. As shown in FIG. 5, this would be output shaft 26 of the turbine. Rotor blades 28, a plurality of which are provided, are attached to the output shaft and combine with stator blading 30 to cause the rotor shaft to rotate as drilling fluid is pumped by the turbine blading. A drilling bit (not shown) is attached to output shaft 26 to be rotated thereby during the drilling operation. As explained above, when the bit is off bottom or is only lightly in engagement with the bottom, the reactive force of the drilling mud on the rotor blading produces a downward thrust on the rotor or output shaft, which must be supported by wear members 18 of thrust bearings 32 as shown in FIG. 5. Usually a plurality of such bearings are provided so that the load on each bearing is reduced proportionately. During the drilling operations, however, a downward force is imposed on the drilling bit by drill collars above the turbodrill. This force is transmitted through the turbodrill bearing housing 33 and the bearings to output shaft 26. Wear member 20 of the bearings receives the load on the bearings at this time.

Preferably, wear members 18 and 20 are made of a material having a substantially greater compressive strength than the elastomer employed to form the body that supports them in the bearing. Also, preferably, a self-lubricating material is used, such as one of the fluorocarbons. One material that has been used with great success is a polyphenylene sulfide resin material sold under the trademark Ryton. This material has a higher compressive strength than the fluorocarbons and, also, will maintain its physical properties at higher temperatures than the fluorocarbons. By mounting the wear members in a body of elastomeric material, the members can shift to the extent required to adjust to the load imposed on the members by the load they are supporting. In field tests of a bearing employing Ryton wear members or inserts, the wear pattern on the wear inserts indicated that the individual wear inserts which, in this case, were cylindrical in shape, would shift in their body of elastomeric material so that the members were inclined from the perpendicular in a direction in which the load they were supporting was rotated. Also, by using wear inserts to support the load that have good high compressive strength, the rubber or body of elastomeric material is not deformed to the extent that flow through grooves 16 is impaired resulting in much better lubrication to the bearing while it is operating. This results in, of course, a greater life for the bearing. It is also important to position the wear inserts so that the load imposed on the bearing is transmitted to support flange 12 and to housing 10 with a minimum of distortion of the elastomeric body. This, again, results in greater bearing life.

Figure 4:
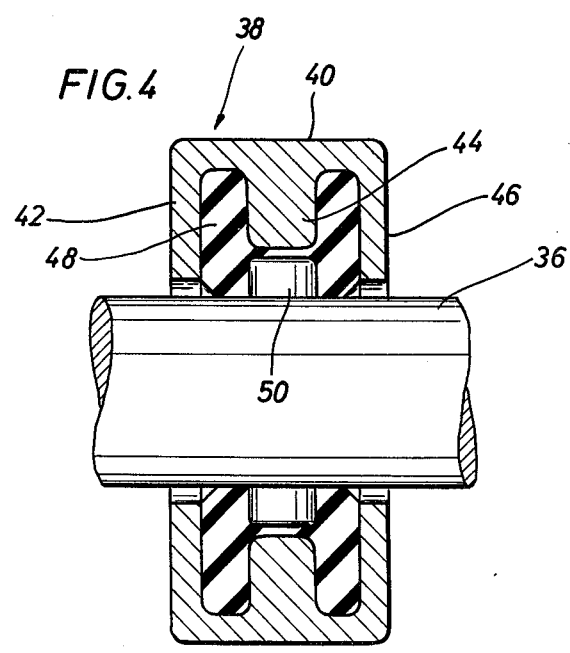
FIG. 4 is a radial bearing embodying the principals of this invention.

FIG. 4 shows the bearing of this invention adapted for use as a radial bearing to support shaft 36 as it rotates on its longitudinal axis. In this embodiment, housing 38 includes annular cylindrical portion 40 and inwardly extending annular flange portions 42, 44 and 46. The outer flange portions 42 and 46 serve to hold body 48 of elastomeric material in position in housing 38. Body 48 encloses central support flange member 44, as shown. A plurality of wear members 50 are spaced symmetrically around the inner circumference of annular body 48 of elastomeric material to provide a bearing surface to engage shaft 36 and support it for rotation. These members are positioned as shown in FIG. 4 to transmit the load thereon to the inner surface of inwardly extending flange 44 of the housing with a minimum of distortion of the body of elastomeric material that supports the wear members. Since the load is transmitted to the housing with a minimum of distortion of the elastomeric material forming the body, outside flanges 42 and 46 can be eliminated in many applications of this invention to radial bearings.

From the foregoing, it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the apparatus of this invention without departing from the scope thereof, it is to be understood that all matter herein set forth or shown in the accompanying drawings is to be interpreted as illustrative and not in a limiting sense.

The invention having now been described, what is claimed is:

1. A bearing comprising a housing including an annular member and a flange member extending from the annular member transverse the longitudinal axis of the annular member, an annular body of elastomeric material supported by the housing and a plurality of inserts embedded in the body of elastomeric material with each insert having one side exposed to combine with the other inserts to provide a bearing surface and its other side positioned near the flange member to transmit the load on the bearing surfaces of the inserts to the flange member and to allow each insert to adjust individually to the load imposed on the bearing.

2. The bearing of claim 1 in which the wear inserts are located on one side of the flange member to provide bearing support for a load acting along the longitudinal axis of the housing.

3. The bearing of claim 1 in which the wear inserts are positioned to provide bearing support for a load acting transverse the longitudinal axis of the housing.

4. The bearing of claim 1 in which the wear members are made of self-lubricating material.

5. The bearing of claim 4 in which the wear members are made of polyphenylene sulfide resin.

6. The bearing of claim 4 in which the wear members are made of one of the fluorocarbons.

7. The bearing of claim 1 in which the body of elastomeric material is provided with a plurality of grooves through which fluid may flow to lubricate the bearing.

8. The bearing of claim 1 in which the wear members are cylindrical and the support body is provided with cylindrical cavities to receive the inserts having a diameter less than the inserts to cause the elastomeric material of the body to grip the inserts located in the cavities.

9. A thrust bearing assembly for transmitting the axial load on the output shaft of a downhole motor between the shaft and the motor comprising a housing connected to the motor through which the output shaft extends, a plurality of bearings located in the housing, each bearing comprising a bearing casing having a cylindrical portion and an inwardly extending support member attached to the cylindrical portion between the ends thereof, a body of elastomeric material located on opposite sides of the support member, and a plurality of wear members positioned in the body of elastomeric material on both sides of the support member to transmit the load imposed on the bearing to the support member, said wear members being supported by the body of elastomeric material so that each wear member may adjust individually to the load on each member, means for transmitting the axial load on the output shaft to the bearings, and means for transmitting the load on the bearings to the bearing housing.

* * * * *